No. 897,216. PATENTED AUG. 25, 1908.
J. MACPHAIL.
DISK HARROW.
APPLICATION FILED MAR. 17, 1906.
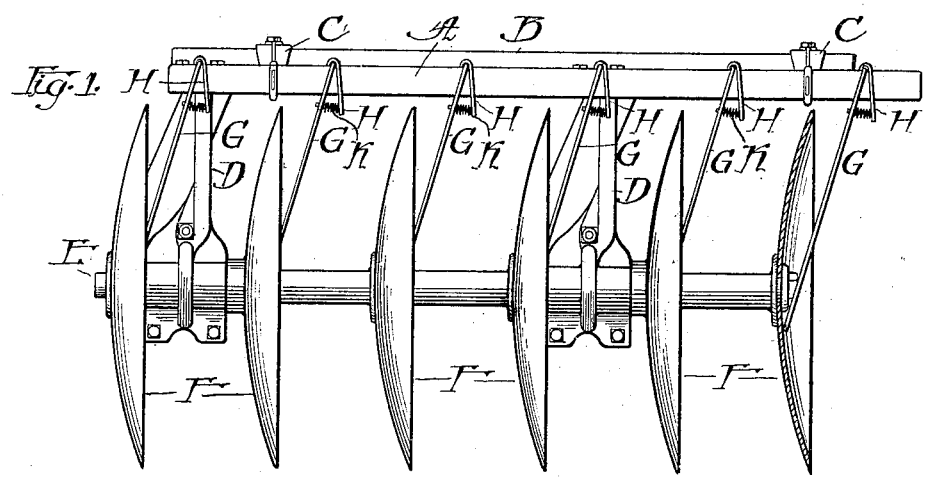
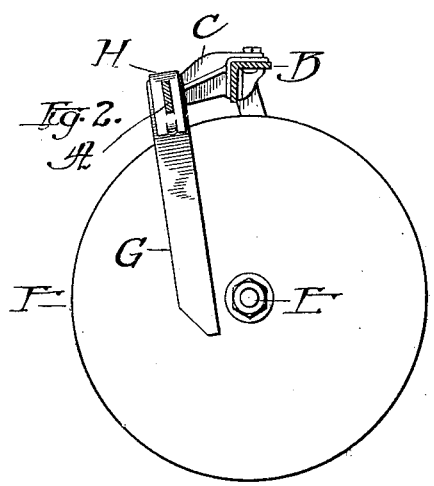
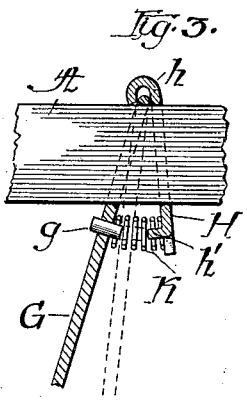
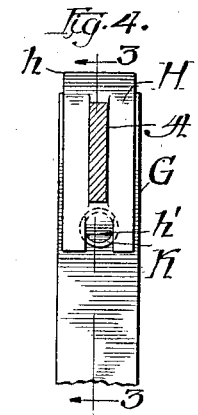
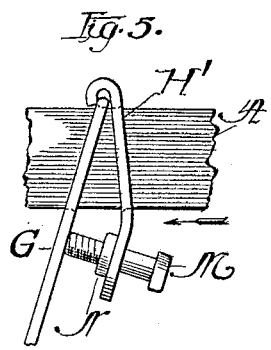
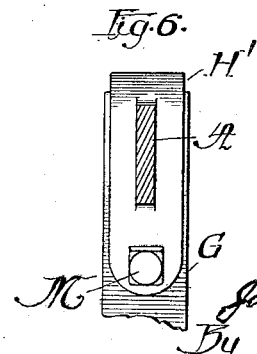
Witnesses:
T. J. Alfreds
Katharine Gerlach
Inventor:
James Macphail
By Paine & Fisher
Attys.

UNITED STATES PATENT OFFICE.

JAMES MACPHAIL, OF DAVENPORT, IOWA, ASSIGNOR TO THE JANESVILLE MACHINE COMPANY, OF JANESVILLE, WISCONSIN, A CORPORATION.

DISK HARROW.

No. 897,216. Specification of Letters Patent. Patented Aug. 25, 1908.

Application filed March 17, 1906. Serial No. 306,577.

*To all whom it may concern:*

Be it known that I, JAMES MACPHAIL, a citizen of the United States, residing at Davenport, in the county of Scott and State of Iowa, have invented certain new and useful Improvements in Disk Harrows, of which I do declare the following to be a full, clear, and exact description, reference being had to the accompanying drawing, forming part of this specification.

Figure 1 is a view in rear elevation of a gang of disk harrows, one of the disks being shown in vertical cross section. Fig. 2 is a view in side elevation of one of the disks with the scraper blade in position with respect thereto, the scraper bar and the frame bar of the harrow being shown in cross section. Fig. 3 is a view in vertical section on line 3—3 of Fig. 4. Fig. 4 is a view in side elevation of the parts shown in Fig. 3. Fig. 5 is a view in rear elevation showing a modified form of the invention. Fig. 6 is an end view of the parts shown in Fig. 5 looking in the direction of the arrow in said Fig. 5.

Referring more particularly to the construction shown in Figs. 1, 2, 3 and 4 of the drawings, A designates the scraper bar that is supported in the usual or any suitable manner from the frame bar B, the scraper bar A being shown as suspended by the brackets C bolted to and projecting rearwardly from said frame bar. The frame bar B is connected in the usual or any suitable manner, as, for example, by standards D with the axle E whereon the harrow disks F are fastened. The supporting and shifting of the scraper bar, the manner of connecting said bar to the main frame and the manner of supporting the main frame form no part of the present invention, as these results may be accomplished by any of the familiar constructions well known to the trade.

Upon the scraper bar A, which is preferably a flat bar, are mounted the several scraper blades G, each of these blades being formed with a slot or cut-away space at its upper end to permit the blade to be slipped onto the bar A. The slot in the upper end of each of the scraper blades G is slightly larger than the dimensions of the bar A, so as to permit the scraper blades to stand at an angle to the scraper bar, and also permit a slight rocking of the scraper blades about their longitudinal axes in order to insure the proper bearing of the blades against the surfaces of the disks F. Upon the scraper bar A, at the upper end of each of the scraper blades G, is mounted what for convenience may be termed a presser-arm H, each of these arms H being slotted or cut-away to enable it to properly engage the scraper bar A. In the preferred form of the invention, each of the presser-arms H has its upper end arranged to engage the upper end of the corresponding scraper blade G and for this purpose each of the presser-arms H is formed at its upper end with a hook $h$ that sets over the upper end of the scraper blade G.

Between the lower portion of each presser arm H and its corresponding scraper blade G may be interposed a suitable pressure device that serves to normally spread these parts and aid in retaining them in proper position upon the scraper bar A. In the preferred form of the invention, the pressure device consists of a spring K and to better retain this spring in position, the presser-arm H may be provided with a lug $h'$, and a similar lug or pin $g$ may be projected from the face of the scraper blade G. The pressure device thus interposed between the presser-arm H and the scraper blade G serves to cramp or bind these parts upon the upper and lower edges of the scraper bar A and where the pressure device consists of a spring the scraper-blade G is permitted to yield and move towards the presser arm as indicated by the dotted lines in Fig. 3 of the drawings; but it will be seen that as the scraper blade G is thus moved from the position shown by full lines to the position shown by dotted lines, the pressure upon the presser arm H will serve to hold the parts against shifting lengthwise from proper position upon the scraper bar.

In the form of the invention shown in Figs. 5 and 6 of the drawing, the scraper blade G and the presser bar H' are cut away or slotted to engage the scraper bar A, but in this form of the invention the pressure device that serves to cramp and retain these parts upon the scraper bar comprises an adjustable screw M that passes through a hole in the lower end of the presser bar H' and is furnished with an adjusting nut $m$. It will thus be seen that when the scraper blade G and the presser bar H' have been located at the desired position, the set screw M will be adjusted so as to tightly cramp or bind these parts upon the scraper bar.

The present invention has many features of advantage that will readily occur to those familiar with this class of devices, a most important one being that the scraper blades can be held in position upon the scraper bar without the necessity of employing the retaining bolts as in prior constructions.

It will be understood, of course, that the details of construction above set out may be widely varied wthout departing from the scope of the invention.

Having thus described my invention, what I claim as new, and desire to secure by Letters Patent, is:—

1. In a disk harrow, the combination with a suitably supported scraper bar and with the harrow disks, of a series of scraper blades adjustably mounted upon the scraper bar, a series of presser arms also mounted upon the scraper bar and adjustable along the same and a pressure device for binding each scraper blade and its corresponding presser arm upon the scraper bar.

2. In a disk harrow, the combination with a suitably supported scraper bar and with the harrow disks, of a series of scraper blades slidably mounted upon the scraper bar, a series of presser arms also mounted upon the scraper bar and adjustable along the same and a pressure device interposed between each scraper blade and its corresponding presser-arm for holding the same in position upon the scraper bar.

3. In a disk harrow, the combination with a suitably supported scraper bar and with the harrow disks, of a series of scraper blades adjustably mounted upon the scraper bar, a series of presser arms also mounted on the scraper bar and adjustable along the same and a yielding pressure device interposed between each scraper blade and its corresponding presser-arm and serving to retain these parts in position upon the scraper bar.

4. In a disk harrow, the combination with a suitably supported scraper bar and with the harrow disks, of a series of slotted scraper blades and a series of slotted presser-arms mounted upon the scraper bar, and a pressure device interposed between said parts and serving to bind them upon the scraper bar.

5. In a disk harrow, the combination with a suitably supported scraper bar and with the harrow disks, of a series of slotted scraper blades and a series of slotted presser-arms mounted upon the scraper bar, and a series of pressure devices arranged to turn the scraper blades and the presser arms in the plane of the scraper bar and to thus bind said parts upon the scraper bar.

6. In a disk harrow, the combination with a suitably supported scraper bar and with the harrow disks, of a series of scraper blades adjustably mounted upon the scraper bar, a series of presser arms also mounted upon the scraper bar and adjustable along the same and arranged to engage the scraper blades and pressure devices interposed between the scraper blades and the presser arms and serving to hold said parts in position upon the scraper bar.

7. In a disk harrow, the combination with a suitably supported scraper bar and with the harrow disks, of a series of slotted scraper blades mounted upon the scraper bar, a series of slotted presser arms also mounted upon the scraper bar and having their upper ends engaging the upper ends of the scraper blades, and springs interposed between said presser arms and said scraper blades, said springs acting in the direction of the length of the scraper bar.

8. In a disk harrow, the combination with a suitably supported scraper bar and with the harrow disks, of a series of scraper blades having their upper ends formed with slots slightly larger than the width of the scraper bar whereon they are mounted, a series of slotted presser arms also mounted upon the scraper bar and a series of springs arranged to cause the tops and bottoms of the slots of the scraper blades to bind upon the upper and lower edges of the scraper bar.

9. In a disk harrow, the combination with a suitably supported scraper bar and with the harrow disks, of a series of scraper blades mounted upon and slidably adjustable along said scraper bar and a series of yielding clamp devices for automatically securing said blades in any desired adjusted position upon said bar.

10. In a disk harrow, the combination with a suitably supported scraper bar and with the harrow disks, of a series of scraper blades mounted upon said bar, a series of clamp devices engaging said blades and also mounted on said bar, said blades and said clamp devices having slots through which said bar extends and said blades and clamp devices being adjustable along said bar, and means adjustable with said blades and clamp devices for securing said clamp devices to said bar.

11. In a disk harrow, the combination with a suitably supported scraper bar and with the harrow disks, of a series of slotted scraper blades for said disks adjustably mounted upon the scraper bar and a series of slotted clamp devices mounted on said bar and adjustable with said blades arranged to secure said blades in adjusted position on said bar.

12. In a disk harrow, the combination with a suitably supported scraper bar and with a harrow disk, of a scraper blade for said disk slotted at its upper end to slidably engage said bar, a clamping device adjustably mounted on said bar and engaging the upper end of said blade, and means adjustable with said blade and clamping device for securing the same in position upon said bar.

13. In a disk harrow, the combination with a suitably supported scraper bar and with the harrow disks, of a series of scraper blades each having a slot at its upper end through which said bar extends, said blades being adjustable along said bar and a series of clamping devices also mounted on said bar and adjustable along the same for securing said blades in position thereon.

14. In a disk harrow, the combination with a suitably supported scraper bar and with the harrow disks, of a series of scraper blades mounted on said bar, each of said blades having a slot in its upper end through which said bar extends, said blades being adjustable along said bar, and a series of clamping devices for holding said blades in adjusted position on said bar, said clamping devices having slots through which said bar extends and being adjustable along said bar with said scraper blades.

15. In a disk harrow, the combination with a suitably supported scraper bar and with the harrow disks, of a series of scraper blades for said disks each having a slot at its upper end to slidably engage said bar, a series of clamping devices having slots for slidably engaging said bar and hooks for engaging the upper ends of said blades, and means adjustable with said blades and clamping devices for securing the same in position upon said bar.

JAMES MACPHAIL.

Witnesses:
  S. C. COBB,
  F. H. FARNSWORTH.